United States Patent
Mermoud et al.

(10) Patent No.: US 11,902,472 B2
(45) Date of Patent: Feb. 13, 2024

(54) APPLICATION ROUTING BASED ON USER EXPERIENCE METRICS LEARNED FROM CALL TRANSCRIPTS

(71) Applicant: Cisco Technology, Inc., San Jose, CA (US)

(72) Inventors: Grégory Mermoud, Venthône (CH); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/828,141

(22) Filed: May 31, 2022

(65) Prior Publication Data

US 2023/0388423 A1    Nov. 30, 2023

(51) Int. Cl.
*H04M 3/42* (2006.01)
*H04M 7/00* (2006.01)
*H04L 41/16* (2022.01)

(52) U.S. Cl.
CPC .......... *H04M 7/0084* (2013.01); *H04L 41/16* (2013.01); *H04M 3/42221* (2013.01); *H04M 7/0066* (2013.01); *H04M 2201/40* (2013.01)

(58) Field of Classification Search
CPC .......... H04M 7/0084; H04M 3/42221; H04M 7/006; H04L 41/16
USPC ...................................................... 370/352
See application file for complete search history.

(56) References Cited

U.S. PATENT DOCUMENTS

| | | | |
|---|---|---|---|
| 10,244,104 B1* | 3/2019 | Ireland | G10L 25/60 |
| 11,528,364 B2* | 12/2022 | Lundsgaard | H04M 3/5232 |
| 2012/0320784 A1* | 12/2012 | Edwards | H04L 43/04 370/252 |
| 2021/0076002 A1 | 3/2021 | Peters | |
| 2021/0210097 A1 | 7/2021 | Diamant et al. | |
| 2022/0059096 A1 | 2/2022 | Ackerman et al. | |
| 2022/0068279 A1 | 3/2022 | Embar et al. | |
| 2022/0139398 A1 | 5/2022 | Joller et al. | |

OTHER PUBLICATIONS

Hsu, W. N., Bolte, B., Tsai, Y. H. H., Lakhotia, K., Salakhutdinov, R., & Mohamed, A. (2021). Hubert: Self-supervised speech representation learning by masked prediction of hidden units. IEEE/ACM Transactions on Audio, Speech, and Language Processing, Jun. 29, 2021, 3451-3460.

(Continued)

*Primary Examiner* — Ahmad F. Matar
*Assistant Examiner* — Jirapon Tulop
(74) *Attorney, Agent, or Firm* — BEHMKE INNOVATION GROUP LLC; James M. Behmke; James J. Wong

(57) ABSTRACT

In one embodiment, a device obtains call transcripts from an online application. The device detects cues within the call transcripts that are indicative of poor user experience. The device generates, based in part on the cues detected within the call transcripts, a model trained to predict poor user experience from network path telemetry for the online application. The device causes traffic for the online application to be routed along a particular network path, based on a prediction by the model.

20 Claims, 9 Drawing Sheets

(56) References Cited

OTHER PUBLICATIONS

Latif, S., Rana, R., Khalifa, S., Jurdak, R., Qadir, J., & Schuller, B. W. (2020). Deep representation learning in speech processing: Challenges, recent advances, and future trends. Sep. 2001, 25 pages, arXiv preprint arXiv:2001.00378.Ke.
Rix, A. W., Beerends, J. G., Hollier, M. P., & Hekstra, A. P. (May 2001). Perceptual evaluation of speech quality (PESQ)—a new method for speech quality assessment of telephone networks and codecs. In 2001 IEEE international conference on acoustics, speech, and signal processing. Proceedings (Cat. No. 01CH37221) (vol. 2, pp. 749-752), May 2001, 4 pages, IEEE.
Schneider, S., Baevski, A., Collobert, R., & Auli, M. (Apr. 2019). wav2vec: Unsupervised pre-training for speech recognition, 9 pages, arXiv preprint arXiv:1904.05862.
Van Den Oord, A., Li, Y., & Vinyals, O. (Jan. 2019). Representation learning with contrastive predictive coding. arXiv e-prints, 13 pages, arXiv-1807.
Vaswani, A., Shazeer, N., Parmar, N., Uszkoreit, J., Jones, L., Gomez, A. N. & Polosukhin, I. (Dec. 2017). Attention is all you need. Advances in neural information processing systems (NIPS), Dec. 2017, 15 pages, arXiv:1706.03762v5 [cs.CL].
Wang, X., & Yamagishi, J. ( Jan. 2022). A Practical Guide to Logical Access Voice Presentation Attack Detection, 46 pages, arXiv preprint arXiv:2201.03321.
Zeghidour, N., Teboul, O., Quitry, F. D. C., & Tagliasacchi, M. (Jan. 2021). Leaf: A learnable frontend for audio classification, 16 pages, arXiv preprint arXiv:2101.08596.

\* cited by examiner

APPLICATION ROUTING BASED ON USER EXPERIENCE METRICS LEARNED FROM CALL TRANSCRIPTS

TECHNICAL FIELD

The present disclosure relates generally to computer networks, and, more particularly, to application routing based on user experience metrics learned from call transcripts.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques, in order to maximize the user experience for a given application. However, quantifying the user experience is not a straightforward task. Traditionally, user experience was inferred from the performance of the network itself. For example, a mean opinion score (MOS) is often computed as a function of the loss, latency, and jitter along the network path. Many applications, though, are now resilient to certain network conditions, meaning that even an SLA violation does not necessarily result in poor user experience. Alternatively, some applications include the ability to garner feedback directly from their users, such as by asking users to rate their experience at the end of a videoconference. This too, though, ignores the temporal aspects of the underlying metrics. In addition, it is impractical to ask users to provide continuous feedback ratings throughout their use of the application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
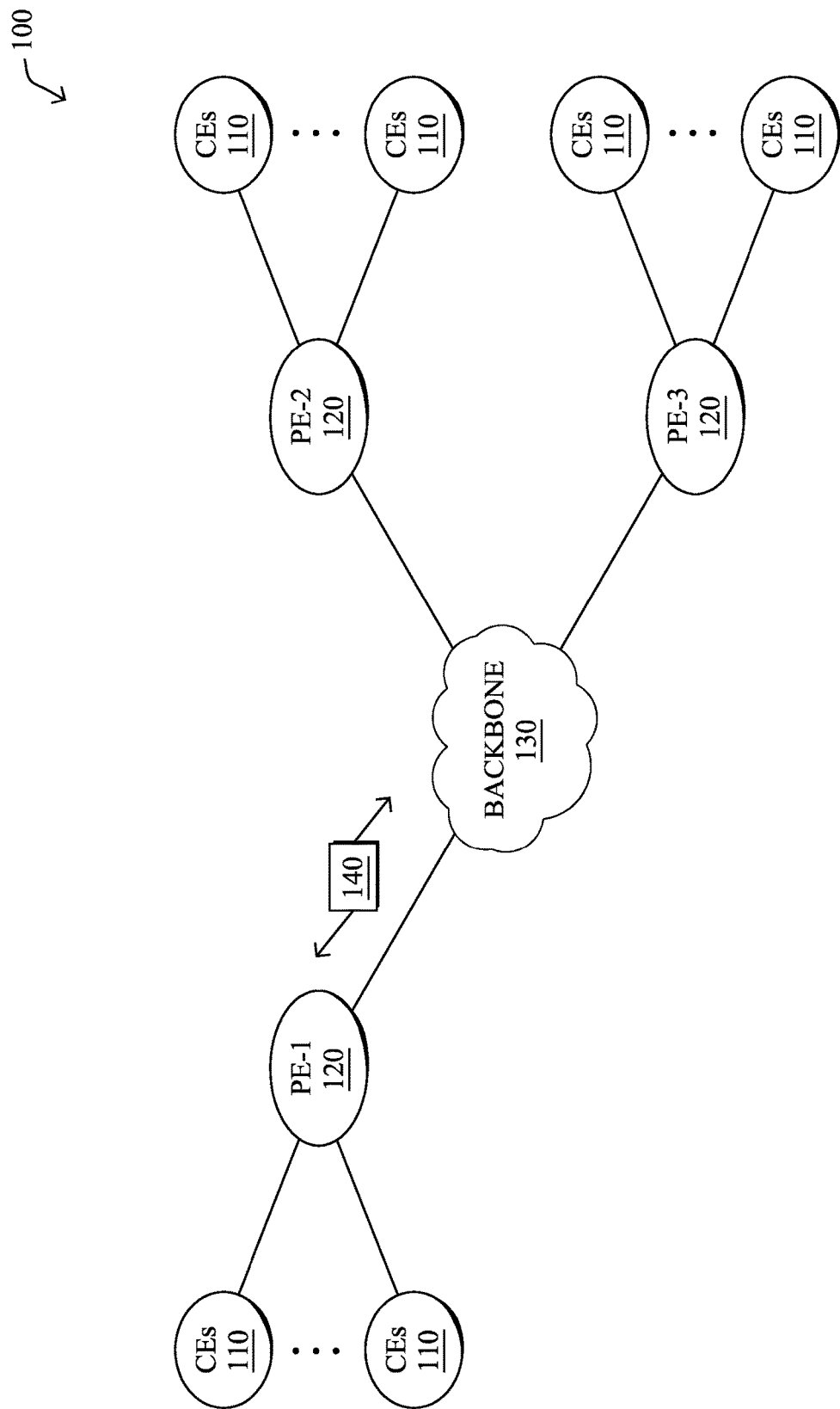
FIGS. 1A-1B illustrate an example communication network.

According to one or more embodiments of the disclosure, a device obtains call transcripts from an online application. The device detects cues within the call transcripts that are indicative of poor user experience. The device generates, based in part on the cues detected within the call transcripts, a model trained to predict poor user experience from network path telemetry for the online application. The device causes traffic for the online application to be routed along a particular network path, based on a prediction by the model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
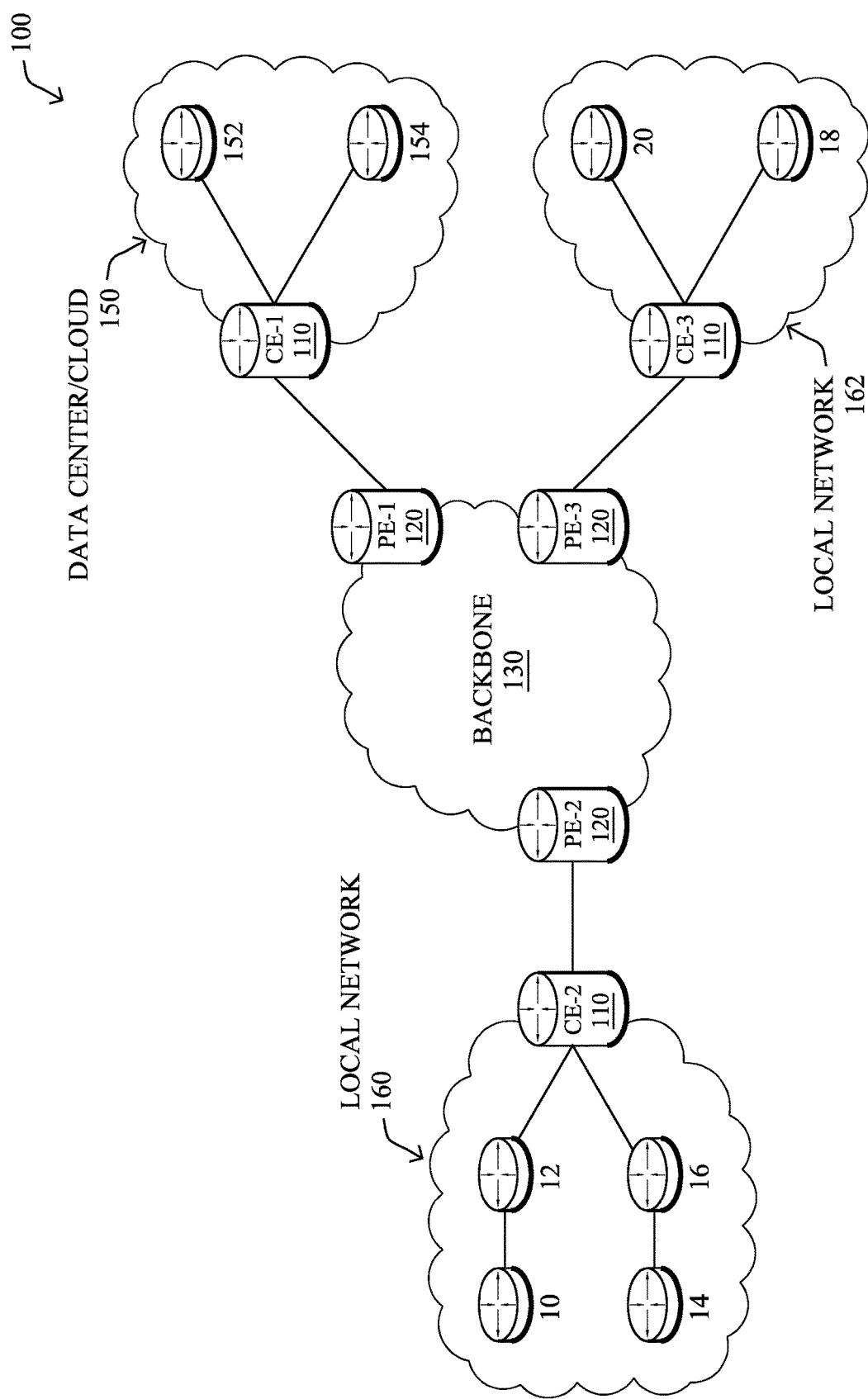

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
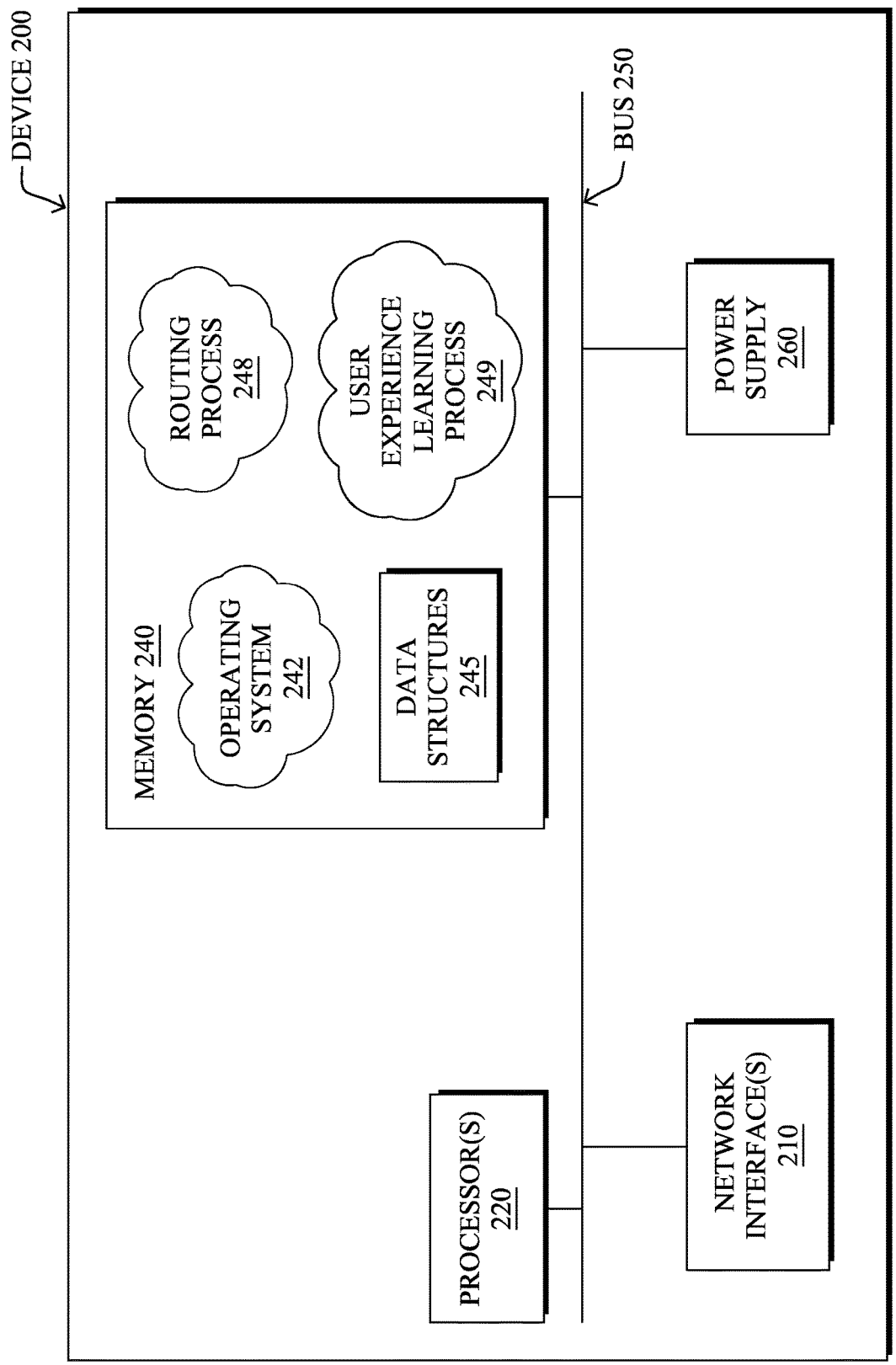
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 248 and/or a user experience learning process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 248 and/or user experience learning process 249 may include computer executable instructions that, when executed by processor(s) 220, cause device 200 to perform the techniques described herein. To do so, in some embodiments, routing process 248 and/or user experience learning process 249 may utilize artificial learning/machine learning. In general, artificial intelligence/machine learning is concerned with the design and the development of techniques that take as input empirical data (such as network statistics and performance indicators), and recognize complex patterns in these data. One very common pattern among these techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 248 and/or user experience learning process 249 may employ one or more supervised, unsupervised, or semi-supervised machine learning models. Generally, supervised learning entails the use of a training set of data, as noted above, that is used to train the model to apply labels to the input data. For example, the training data may include sample data that has been labeled as indicative of acceptable user experience or poor user experience. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 248 and/or user experience learning process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

Figure 3A:
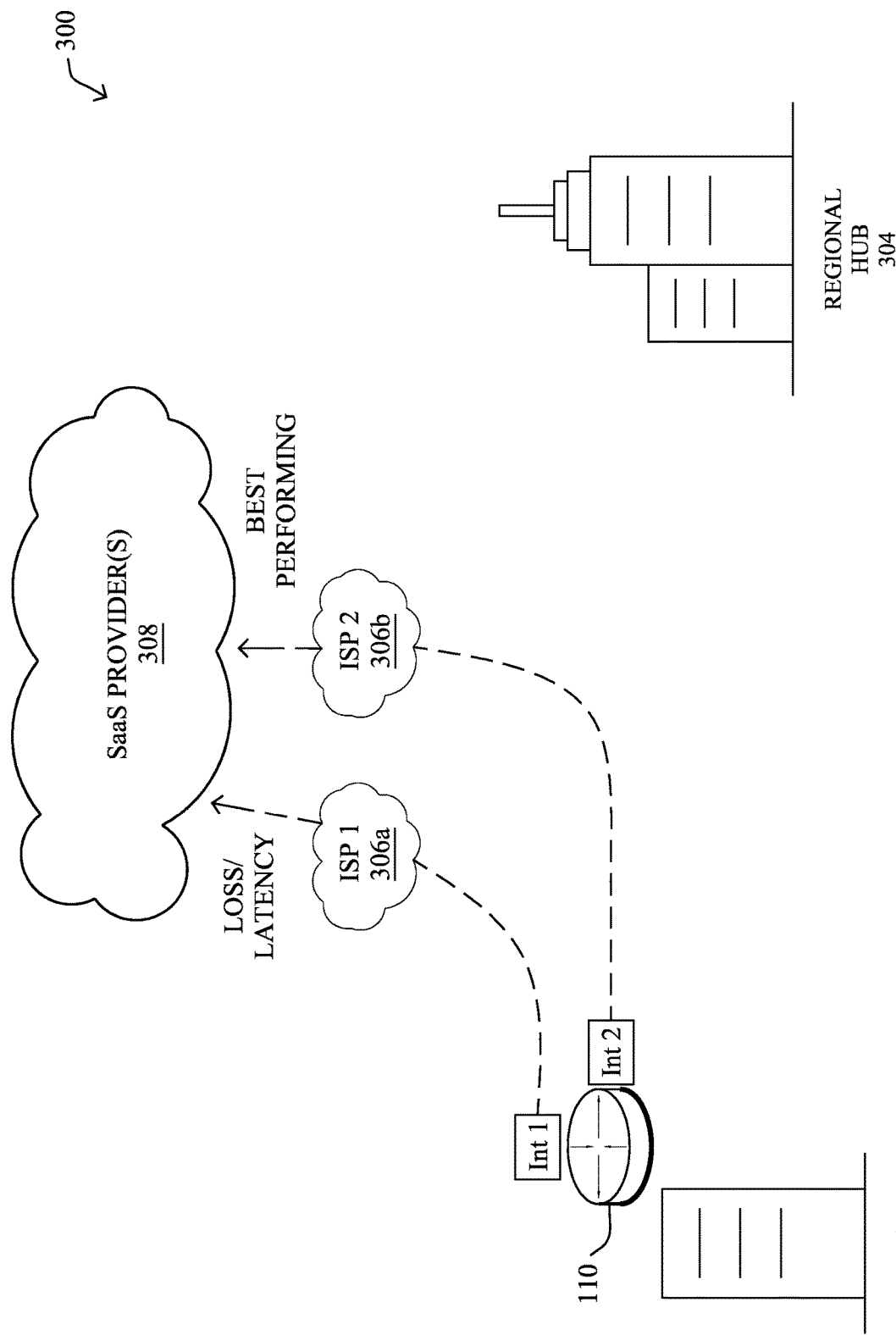
FIGS. 3A-3B illustrate example network deployments.
Figure 3B:
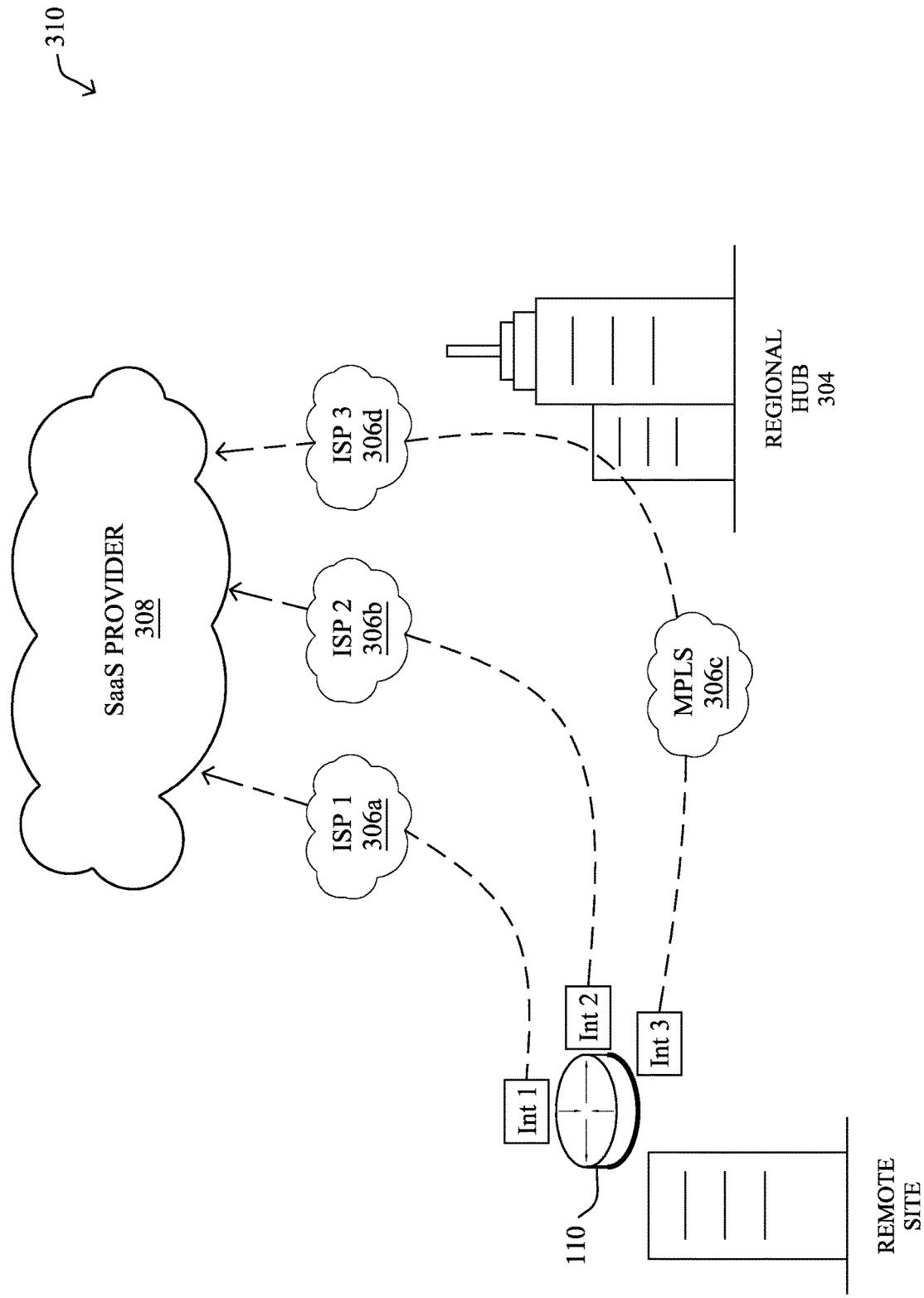

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network. FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet. MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
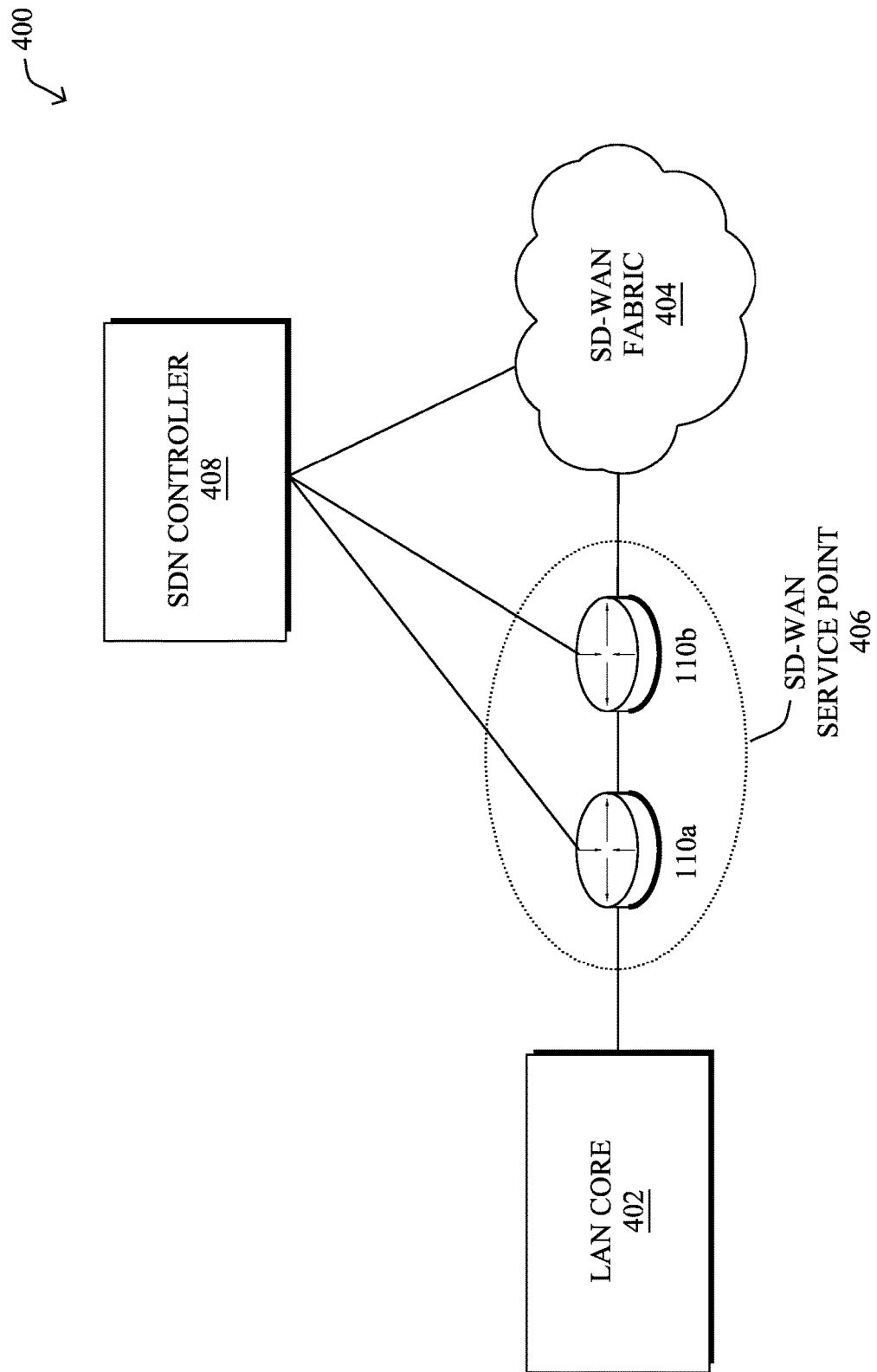
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

A primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application (i.e., the user experience).

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing. CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modem SaaS solutions like Viptela. CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed.' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
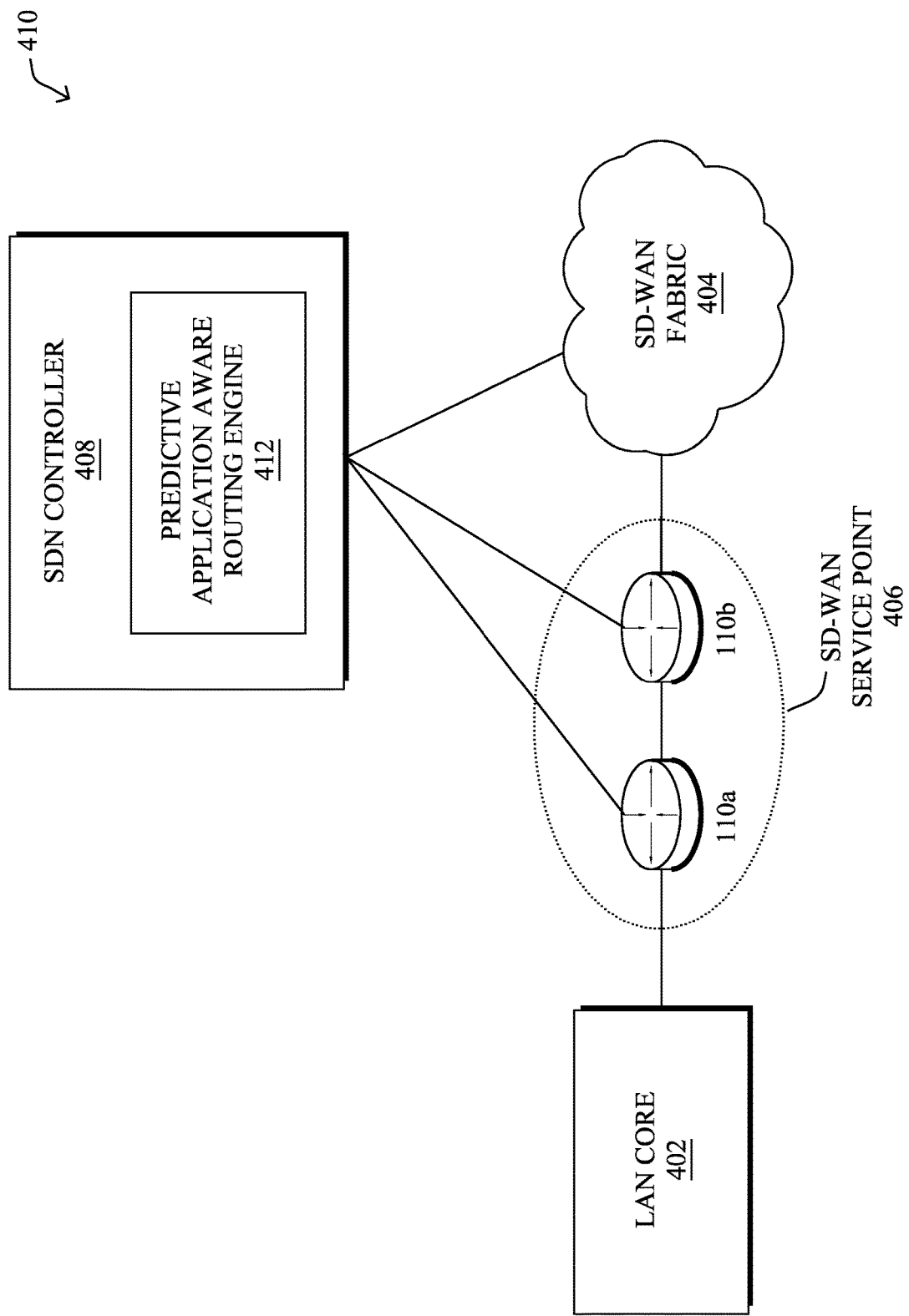

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As would be appreciated, modem SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:

- Obtaining user feedback directly from the application
- Applying traffic analytics, such as by analyzing Netflow records that include extra metrics like Application Response Time (ART)
- Sending synthetic path probes to measure networking metrics to each SaaS application from each location. These probes are 'synthetic' in that they seek to mimic the actual characteristics of the traffic of the application under scrutiny.
- Using hand-crafted heuristics based on domain expertise and other quantities (e.g., the concealment time)

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, predictive application-aware routing aims to select the best path out of a collection of paths ($P_1$, $P_2 \ldots, P_N$), such that end users of a given application (e.g., WebEx. Microsoft Teams, Zoom, Salesforce, SharePoint, etc.), or custom applications hosted in a private datacenter (and monitored via tools such as Datadog, AppDynamics, etc.), have the best user experience possible. However, quantifying the true user experience as QoE metrics is still quite challenging. Even relying on the above approaches to determine the QoE using Layer 3 information (e.g., based on probes) and/or Layer 7 information (e.g., from the application itself) can lead to inaccurate results. Indeed, experimentation has shown that they suffer from several fundamental flaws:

- Because they are expensive and complex to design and evaluate, handcrafted experience scores are never re-evaluated, even as codecs and application software get improved and updated. For instance, certain audio codecs for voice applications are now resilient to packet loss up to 30%, while others cannot tolerate that high of a threshold.
- They focus on a very small subset of the available data that would otherwise allow to characterize the quality of experience of a user. Many other quantities could be indicative of the user experience, including the bitrate (transmit and receive), the concealment time, the CPU and memory load of the client, and many other pieces of information.

They never consider the temporal aspect of the underlying Layer 3 and/or Layer 7 metrics. The mean opinion score (MOS), for instance, only accounts for averages over a given window of interest, thus washing out all transient issues, which could be extremely detrimental to the user experience.

Application Routing Based on User Experience Metrics Learned from Call Transcripts The techniques introduced herein provide for the estimation of the true experience of users of collaboration applications, such as Voice over IP (VoIP) applications, video-conferencing applications (e.g., WebEx. Microsoft Teams. Zoom, etc.), and the like. In some aspects, the techniques herein do so by applying self-supervised learning to a large amount of call recordings, as well as by applying supervised refinements on a much smaller subset of transcript-based cues of bad quality. In further aspects, the techniques herein also introduce a way to use the resulting model to perform path selection in a way that truly optimizes the user experience, either in a reactive or predictive fashion.

Illustratively, the techniques described herein may be performed by hardware, software, and/or firmware, such as in accordance with user experience learning process 249, which may include computer executable instructions executed by the processor 220 (or independent processor of interfaces 210) to perform functions relating to the techniques described herein, such as in conjunction with routing process 248.

Specifically, according to various embodiments, a device obtains call transcripts from an online application. The device detects cues within the call transcripts that are indicative of poor user experience. The device generates, based in part on the cues detected within the call transcripts, a model trained to predict poor user experience from network path telemetry for the online application. The device causes traffic for the online application to be routed along a particular network path, based on a prediction by the model.

Operationally, in various embodiments, an approach is introduced herein whereby a machine learning model is trained to compute a user experience score (UES) (e.g., a QoE metric) from a set of labels that are obtained in a fully automated manner. Instead of adopting the classical approach of performing the tedious process of labeling an existing dataset, the techniques herein propose a type of self-supervised learning whereby the system can autonomously identify segments of calls, videoconferences, or the like, in which one or more users are having a bad experience with the application.

In some embodiments, the techniques herein leverage information present in the call data to serve as an implicit label for the training. More specifically, cues present in the call transcripts, which can be extracted using automated speech recognition, may be detected and used to apply labels to any session of the application. Such labeling can then be used to generate a model to predict the user experience from Layer 3 (network-level) or Layer 7 (application level) telemetry metrics such as loss, latency, jitter, bitrates, concealment times, etc. In turn, such predictions can be used to optimize routing decision for traffic of the application.

Figure 5:
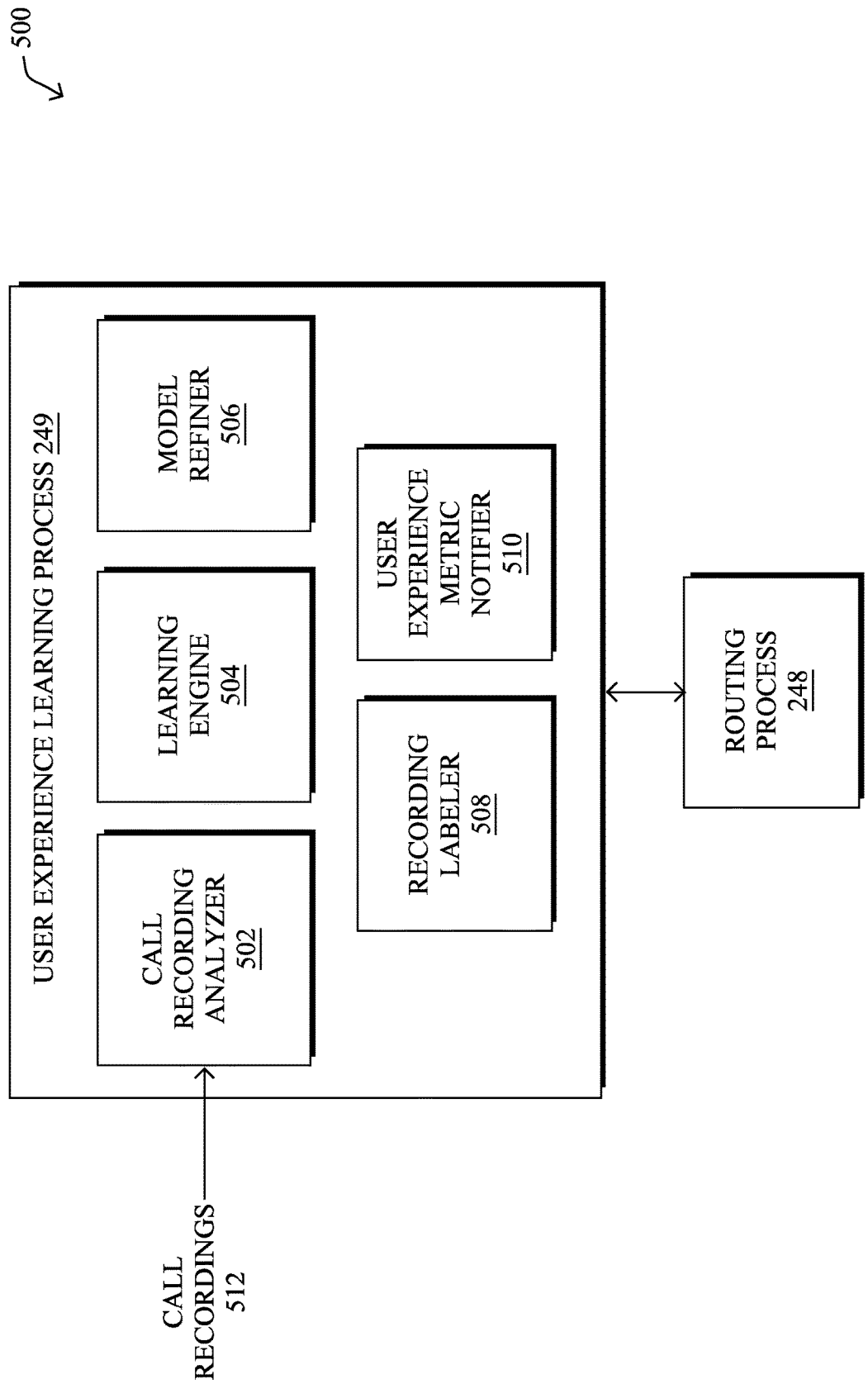
FIG. 5 illustrates an example architecture for application routing based on user experience metrics learned from call transcripts.

FIG. 5 illustrates an example architecture 500 for application routing based on user experience metrics learned from call transcripts, according to various embodiments. At the core of architecture 500 is user experience learning process 249, which may be executed by a controller for a network or another device in communication therewith. For instance, user experience learning process 249 may be executed by a controller for a network (e.g., SDN controller 408 in FIGS. 4A-4B), a particular networking device in the network (e.g., a router, etc.), another device or service in communication therewith, or the like. In some embodiments, for instance, user experience learning process 249 may be used to implement a predictive application aware routing engine, such as predictive application aware routing engine 412, e.g., in conjunction with the execution of routing process 248.

As shown, user experience learning process 249 may include any or all of the following components: call recording analyzer 502, a learning engine 504, a model refiner 506, a recording labeler 508, and/or a user experience metric notifier 510. As would be appreciated, the functionalities of these components may be combined or omitted, as desired. In addition, these components may be implemented on a singular device or in a distributed manner, in which case the combination of executing devices can be viewed as their own singular device for purposes of executing user experience learning process 249.

According to various embodiments, call recording analyzer 502 may obtain a large body of call recordings 512 from the online application of interest. For instance, such an application may be a video conferencing application, a dedicated VoIP application, an application with voice support (e.g., a video game, a collaboration application, etc.), or any other application with functionality to allow two or more users to speak with one another. In other words, call recordings 512 may comprise audio data captured within the application, which may be stored locally or access remotely, such as in a remote repository.

In various embodiments, call recording analyzer 502 may systematically segment call recordings 512 into short excerpts (e.g., of a few seconds up to one minute). Along with those, call recording analyzer 502 may also extract the corresponding call transcripts from call recordings 512 and store them with each segment.

In addition, in various embodiments, call recording analyzer 502 may analyze the transcripts of the various calls made via the online application to detect audio cues that are indicative of poor user experience. For instance, in one embodiment, such cues may include audible sounds such as static or the like. In further embodiments, the cues may include verbal utterances made by users of the online application. For instance, such utterances may include any or all of the following, variations thereof, or the like:

"Can you hear me?"
"You're breaking up."
"Turn off your camera."
Etc.

Call recording analyzer 502 may use such cues to mark their segments as being indicative of poor user experience. To detect such cues, call recording analyzer 502 may use any number of different heuristics on the call transcripts. In some embodiments, they can be simply binary (i.e., 'good' user experience or 'bad' user experience. In other embodiments, they can be used to rate the user experience on a more nuanced basis (e.g., 1-5 stars, etc.).

In various embodiments, user experience learning process 249 may use the transcript segments and their detected cues for two purposes:

The self-supervised learning (SSL) of a speech processing model responsible to evaluate the user experience in each segment. To do so, user experience learning process 249 may rely on the actual structure of the data and the symmetry between different modalities (in this case, the audibility of the audio stream and the presence of audio cues that indicate poor inaudibility) to learn a meaningful predictor. For illustrative purposes, this model is referred to herein as 'wav2ues.'

The supervised training of a model that takes the underlying Layer 3 and/or Layer 7 telemetry of the users during the segment and predicts the user experience. For illustrative purposes, this model is referred to herein as 'tel2ues.'

The fundamental benefit of this approach is that it allows call recordings 512 to be leveraged for purposes of training a prediction model (e.g., tel2ues) that can be used to make routing decisions, even when the transcript cues indicative of poor user experience are rare events.

Learning engine 504 may take the form of a self-supervised learning module that is responsible for pre-training the speech representation model, wav2ues, in various embodiments. To do so, learning engine 504 may rely on a variety of techniques. For instance, in some embodiments, learning engine 504 may use so-called contrastive strategies that use both positive and negative examples. Under such an approach, positive examples are constructed from the sample itself (by distorting it or masking portions of it that need to be reconstructed) and negative examples are obtained by sampling the dataset randomly or by performing so-called "hard negative mining" (i.e., finding examples that are the most likely to confuse the model).

For instance, learning engine 504 may comprise a first convolutional layer (the encoder), which takes as input the raw waveform and constructs a so-called latent representation of the speech, which may be discretized in some variants of the system. This latent representation may then be fed to a transformer network, a recurrent neural network (RNN), or other network whose role is to build contextual information of the speech (e.g., a word or an n-gram out of the individual phonemes). Now, the training of the system is achieved by backpropagating a so-called contrastive loss through the entire network, which measures the ability of the context to serve as a predictor for the latent state of the next timestep. Importantly, this contrastive loss is not a mere distance between a prediction and a ground truth. Instead, it is minimized when a future sample zi+k that is k steps in the future is clearly distinguished from so-called distractor samples (randomly sampled from other examples in the training set):

$$\mathcal{L}_k = -\sum_{i=1}^{T-k}(\log\sigma(z_{i+k}^T h_k(c_i)) + E_{\tilde{z}\sim p_n}[\log\sigma(-\tilde{z}^T h_k(c_i))])$$

From the above, it should be noted that the equation is negative because the loss is $\top$ to be minimized. It should also be noted that the term "log $\sigma(z_{i+k}^T h_k(c_i))$" is proportional to the probability of $z_{i+k}$ being the true sample and that $E_{\tilde{z}\sim p_n}[\log \sigma(-\tilde{z}^\top h_k(c_i))]$ is inversely proportional to the probability of distractors being the true sample. $\top$ In various embodiments, model refiner 506 my use backpropagation of a classification loss (e.g., cross-entropy) to refine the model obtained from learning engine 504. In this case, the objective is to predict whether a given excerpt leads to a transcript cue indicative of poor user experience (e.g., "you are breaking up," etc.). This can be by adding a densely connected layer on top of the contextual representation with a single neuron as output, whose role is to decide whether a poor-quality cue is expected from this excerpt. Then the entire network is refined by backpropagating this new loss across the entire stack of layers, including the context network and the encoder itself, such as the new model "specializes" for the task of detecting inaudible excerpts. The resulting model, which we call wav2ues is now capable of taking any audio recording in the dataset and detect low-quality segments in them.

According to various embodiments, recording labeler 508 re-uses wav2ues to label a large portion of the recordings available in the dataset and train a model (e.g., neural network, tree-based model, etc.) using a supervised strategy to predict/infer poor user experience. In some embodiments, recording labeler 508 is also responsible for extracting the correct telemetry from the corresponding datasets and join them with the corresponding recording. The resulting model is called tel2ues.

Note that, in some embodiments, the transcript cues could be used directly as labels for training tel2ues, However, doing so would essentially mean reducing the number of labels available, drastically. Since the amount of data available the raw waveform of audio recordings is orders of magnitude higher than in the underlying network telemetry, it is a much better input for a detector of low-quality speech, especially in self-supervised settings. Now, even if reliable low-quality cues from transcripts are rare, the pre-trained algorithm may be quickly refined to achieve similar performances as classical supervised approaches with orders of magnitude fewer labels.

In various embodiments, user experience metric notifier 510 may take the form of a service, connector, or the like, that is configured to convey the user experience from tel2ues to the routing mechanism, such as routing process 248. Such a service may be either cloud-based or on-premise and allow the routing engine (e.g., predictive application aware routing engine 412) to receive the estimated user experience for the online application either by:

providing the corresponding Layer 3 and/or Layer 7 metrics that tel2ues takes as input features, or providing metadata (e.g., meeting identifier, time interval) that allow the service to zero in on the specific telemetry, and user experience metric notifier 510 may take care of fetching the corresponding data.

In either case, user experience metric notifier 510 may construct a suitable feature vector, performs an inference step of tel2ues, and return the corresponding user experience prediction. Using this information, routing process 248 may redirect the call traffic to a different network path. In further embodiments, user experience metric notifier 510 may provide the user experience prediction for display, such as to a network administrator. In turn, the administrator may configure the network based on the prediction (e.g., by configuring the traffic to traverse a particular path, by setting an application server/destination to be used for the traffic, etc.).

Figure 6:
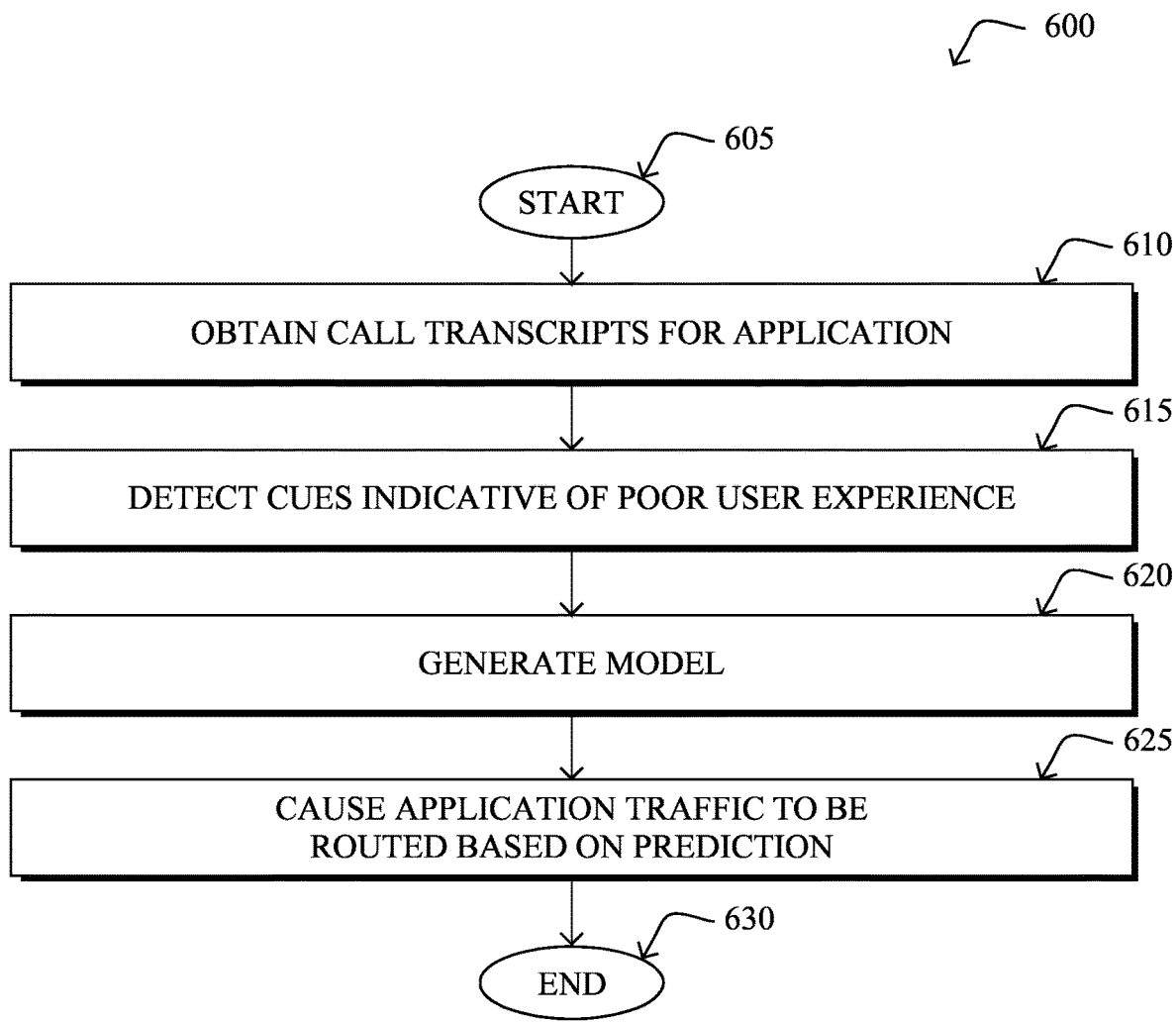
FIG. 6 illustrates an example simplified procedure for application routing based on user experience metrics learned from call transcripts.

FIG. 6 illustrates an example simplified procedure 600 (e.g., a method) for application routing based on user experience metrics learned from call transcripts, in accordance with one or more embodiments described herein. For example, a non-generic, specifically configured device (e.g., device 200), such as controller for a network (e.g., an SDN controller, a cloud-based device, etc.), an edge router, or other device in communication therewith, may perform procedure 600 by executing stored instructions (e.g., user experience learning process 249 and/or routing process 248). The procedure 600 may start at step 605, and continues to step 610, where, as described in greater detail above, the device may obtain call transcripts from an online application. In various embodiments, the online application comprises at least one of: a Voice Over Internet Protocol (VoIP) application or a videoconferencing application.

At step 615, as detailed above, the device may detect cues within the call transcripts that are indicative of poor user experience. In various embodiments, the device may do so in part by converting audio captured by the online application into text. In further embodiments, the cues comprise an utterance by a user of the online application asking whether they can be heard by another user of the online application.

At step 620, the device may generate, based in part on the cues detected within the call transcripts, a model trained to predict poor user experience from network path telemetry for the online application, as described in greater detail above. In some embodiments, the network path telemetry comprises at least one of: jitter measurements, delay measurements, or packet loss measurements. In one embodiment, the model is trained to predict poor user experience based further in part on user experience feedback provided by users of the online application. In another embodiment, the device generates the model in part by using self-supervised learning.

At step 625, as detailed above, the device may cause traffic for the online application to be routed along a particular network path, based on a prediction by the model. In various embodiments, the device may do so by rerouting the traffic for the online application from a first network path to the particular network path, when the prediction by the model indicates that the first network path is going to result in poor user experience. In one embodiment, the device may do so by notifying a routing engine of the prediction. In some embodiments, the particular network path is a path in a software-defined network (SDN). In further embodiments, the device may cause the traffic to be routed along the particular path by providing the prediction for display, such as to a network administrator. In turn, the network administrator may opt to route the traffic via the particular network path, either explicitly or by selecting a particular application server or destination to be used by the traffic. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for application routing based on user experience metrics learned from call transcripts, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, call transcripts from an online application;
detecting, by the device, cues within the call transcripts that are indicative of poor user experience;
generating, by the device and based in part on the cues detected within the call transcripts, a model trained to predict poor user experience from network path telemetry for the online application; and
causing, by the device, traffic for the online application to be routed along a particular network path, based on a prediction by the model.

2. The method as in claim 1, wherein the network path telemetry comprises at least one of: jitter measurements, delay measurements, or packet loss measurements.

3. The method as in claim 1, wherein detecting the cues within the call transcripts that are indicative of poor user experience comprises:
converting, by the device, audio captured by the online application into text.

4. The method as in claim 1, wherein causing traffic for the online application to be routed along a particular network path, based on a prediction by the model, comprises:
rerouting the traffic for the online application from a first network path to the particular network path, when the prediction by the model indicates that the first network path is going to result in poor user experience.

5. The method as in claim 1, wherein the cues comprise an utterance by a user of the online application asking whether they can be heard by another user of the online application.

6. The method as in claim 1, wherein the model is trained to predict poor user experience based further in part on user experience feedback provided by users of the online application.

7. The method as in claim 1, wherein the device generates the model in part by using self-supervised learning.

8. The method as in claim 1, wherein causing traffic for the online application to be routed along a particular network path, based on a prediction by the model, comprises:
notifying a routing engine of the prediction.

9. The method as in claim 1, wherein the online application comprises at least one of: a Voice Over Internet Protocol (VoIP) application or a videoconferencing application.

10. The method as in claim 1, wherein causing the traffic for the online application to be routed along a particular path comprises:
providing the prediction by the model for display.

11. An apparatus, comprising:
one or more network interfaces;
a processor coupled to the one or more network interfaces and configured to execute one or more processes; and a memory configured to store a process that is executable by the processor, the process when executed configured to:
obtain call transcripts from an online application;
detect cues within the call transcripts that are indicative of poor user experience;
generate, based in part on the cues detected within the call transcripts, a model trained to predict poor user experience from network path telemetry for the online application; and
cause traffic for the online application to be routed along a particular network path, based on a prediction by the model.

12. The apparatus as in claim 11, wherein the network path telemetry comprises at least one of: jitter measurements, delay measurements, or packet loss measurements.

13. The apparatus as in claim 11, wherein the apparatus detects the cues within the call transcripts that are indicative of poor user experience by:
converting audio captured by the online application into text.

14. The apparatus as in claim 11, wherein the apparatus causes traffic for the online application to be routed along a particular network path, based on a prediction by the model, by:
rerouting the traffic for the online application from a first network path to the particular network path, when the prediction by the model indicates that the first network path is going to result in poor user experience.

15. The apparatus as in claim 11, wherein the cues comprise an utterance by a user of the online application asking whether they can be heard by another user of the online application.

16. The apparatus as in claim 11, wherein the model is trained to predict poor user experience based further in part on user experience feedback provided by users of the online application.

17. The apparatus as in claim 11, wherein the apparatus generates the model in part by using self-supervised learning.

18. The apparatus as in claim 11, wherein the apparatus causes traffic for the online application to be routed along a particular network path, based on a prediction by the model, by:
notifying a routing engine of the prediction.

19. The apparatus as in claim 11, wherein the online application comprises at least one of: a Voice Over Internet Protocol (VoIP) application or a videoconferencing application.

20. A tangible, non-transitory, computer-readable medium storing program instructions that cause a device to execute a process comprising:
obtaining, by the device, call transcripts from an online application;
detecting, by the device, cues within the call transcripts that are indicative of poor user experience;
generating, by the device and based in part on the cues detected within the call transcripts, a model trained to predict poor user experience from network path telemetry for the online application; and
causing, by the device, traffic for the online application to be routed along a particular network path, based on a prediction by the model.

* * * * *

UNITED STATES PATENT AND TRADEMARK OFFICE
CERTIFICATE OF CORRECTION

| | | |
|---|---|---|
| PATENT NO. | : 11,902,472 B2 | Page 1 of 1 |
| APPLICATION NO. | : 17/828141 | |
| DATED | : February 13, 2024 | |
| INVENTOR(S) | : Grégory Mermoud et al. | |

It is certified that error appears in the above-identified patent and that said Letters Patent is hereby corrected as shown below:

In the Specification

Column 1, Line 35 please amend as shown:
natively, some applications include the ability to garner Column 9, Line 6 please amend as shown:
Modern SaaS solutions like Viptela. CloudonRamp SaaS, Column 10, Line 4 please amend as shown:
As would be appreciated, modern SaaS applications are Signed and Sealed this
Thirtieth Day of April, 2024

Katherine Kelly Vidal
*Director of the United States Patent and Trademark Office*